Nov. 4, 1969     A. S. GRANGE ET AL     3,476,450
SEPARATING MEANS FOR PILLOW BLOCK BEARINGS
Filed April 18, 1967
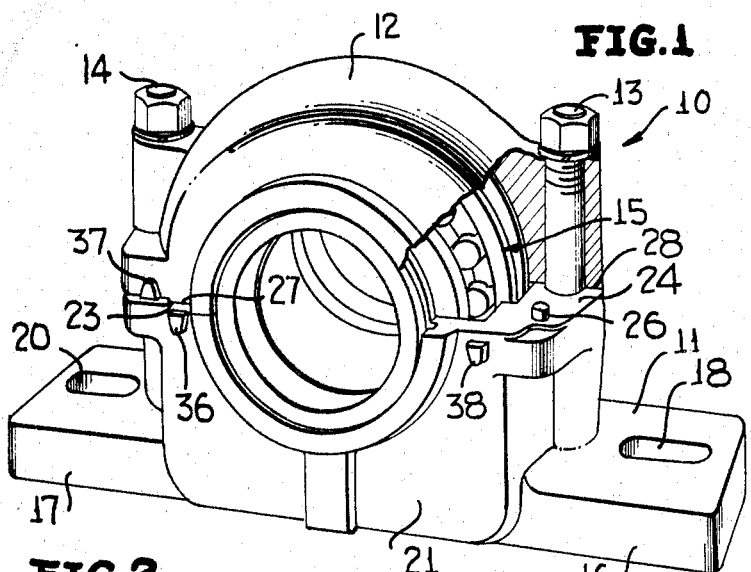
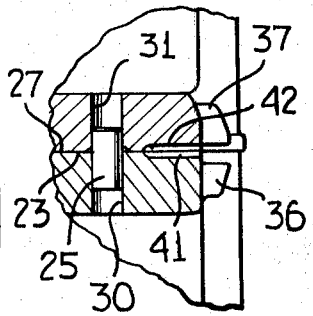
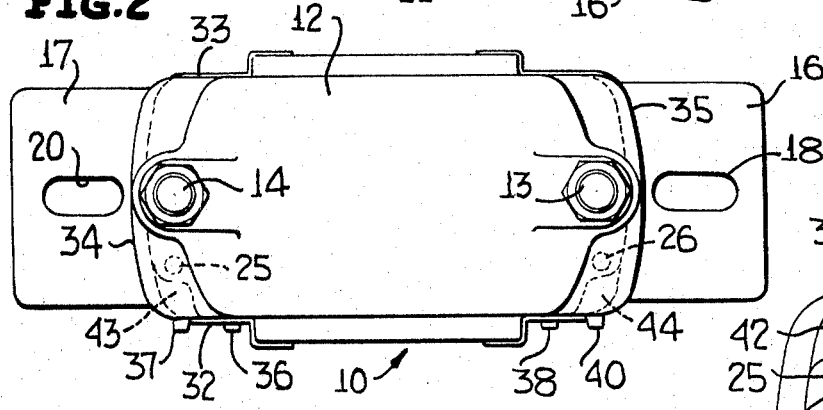
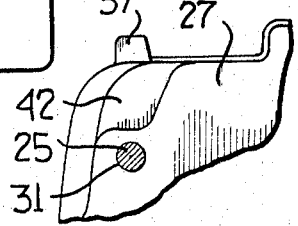
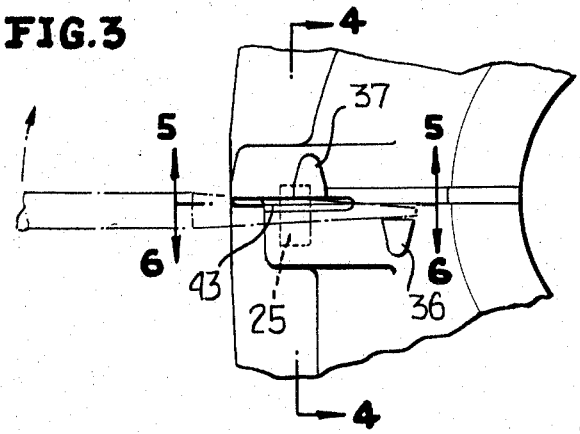
INVENTORS
ARTHUR S. GRANGE &
JOHN McDOUGALL PATON
BY
Mason, Porter, Diller & Brown
ATTORNEYS United States Patent Office 3,476,450
Patented Nov. 4, 1969

3,476,450
SEPARATING MEANS FOR PILLOW BLOCK BEARINGS
Arthur Savage Grange, South Bend, Ind., and John McDougall Paton, Bedford, Quebec, Canada, assignors to The Torrington Company, Torrington, Conn., a corporation of Maine
Filed Apr. 18, 1967, Ser. No. 631,656
Int. Cl. F16c 17/02
U.S. Cl. 308—74         6 Claims

ABSTRACT OF THE DISCLOSURE

This disclosure relates to pillow block bearings, of the type generally having a base and a cap, secured together with butting surfaces on each side of the base and caps in engagement, with bolts generally providing the securing means, and with dowel pins, associated with the base and cap, extending across the butting surfaces of each, for precise alignment of the base and cap, relative to each other. Separating means are provided, either of slot or gap construction, or of spaced lug construction, for inserting a prying tool between opposing ones of the slots or lugs, and thereby separating the caps from the base. The lugs or slots are cast or molded integrally with the base and/or cap, and are spaced as desired, in order to facilitate the insertion of a prying tool therebetween.

This invention relates to separating means for pillow block bearings of generally small sizes, in order to effect an easy removal of a block cap from its associated base, in conditions where dowel pins having close fits are utilized between a cap and a base, and separation by hand becomes impractical.

In bearing pillow blocks of the prior art type, it has long been recognized to use a split housing, or one having separate base and cap portions, secured together at butting surfaces by means of one or more bolts extending through the cap on opposite sides thereof, and secured to the base.

It has also long been recognized that when a split housing is utilized, if precise alignment of the cap and base is at all desirable, it is necessary to provide a positive alignment means, such as dowel pins or the like, fixedly carried by one of the cap or base, and adapted for removable insertion into a bore or hole in the other of the cap or base, across the butting surface portions of the cap and base. In situations where very precise alignment is required, the size of the bore into which the dowel pin is removably inserted conforms very closely to the true diameter of the dowel pin, and thus presents a close fit about the dowel pin, whereby substantial frictional forces must be overcome to separate the cap and the base, due to the presence of the dowel pin in the assembly.

In extremely large bearing pillow blocks, these frictional forces attendent to the presence of the dowel pins in the combinations were so large that it has often been necessary to provide the caps of large bearing pillow blocks tapped holes, into which eyebolts may be inserted and the cap removed from the base by means of a chain hoist or other similar devices. However, mountings for a chain hoist, and even a chain hoist is not always available at the situs of operation of a large bearing, and therefore other cumbersome means such as the impact from a hammer had to be utilized to separate a bearing cap and base in such installations. These other means have been found to be highly undesirable, in that they can readily mar bearing portions, such as the mating surfaces, thereby precluding the desired correct alignment and proper fit of a bearing cap and base upon reassembly thereof.

With regard to smaller bearing pillow blocks, similar problems have developed, in that it has become conventional to strike a bearing cap laterally with a hammer, in those cases where the dowel fit has been so tight that the cap could not be readily removed from the base by grasping the cap and pulling it outwardly away from the base.

The present invention seeks to obviate the above and other difficulties of prior art types of separating means for bearing pillow blocks, in providing means disposed near butting surfaces of a bearing cap and base, specifically designed for the insertion of a prying member therebetween.

Accordingly, it is a primary object of this invention to provide a novel bearing pillow block having a cap and a base, which is split to have surfaces in butting relation to each other, and wherein separating means are provided, disposed near the butting surfaces for facilitating a prying part of the cap and base.

It is a further object of this invention to provide a novel means for separating a bearing cap from its base, wherein slots are provided in one or both of the butting surfaces of the cap and base, the slots being formed integral with the cap and base and being adapted to receive a prying tool therebetween.

It is a further object of this invention to provide lugs cast integrally with a bearing cap and base, for facilitating the separation of the bearing cap from the base, wherein the lugs are spaced on opposite sides of the mating surfaces of the cap and base, the spacing being either or both vertical and/or horizontal, and located in the area of a dowel pin, for insertion or a prying tool between the lugs and consequent separation of the cap from the base.

It is yet another object of this invention to provide, in combination with a bearing pillow block having a cap and base, a novel separating means, utilizing either or both of strategically placed slots and lugs, whereby a prying instrument may be inserted therebetween.

It is a further object of this invention to provide a novel method of separating a bearing cap from a bearing base, wherein pry points are established on each of a cap and base, disposed across the mating surfaces of the cap and base from each other, and wherein a prying instrument is inserted between the pry points and operated as a lever for separating the cap from the base.

With the above and other objects in view that will hereinafter appear, the nature of the invention will be more clearly understood by reference to the following detailed description, the appended claimed subject matter, and the several views illustrated in the accompanying drawing.

In the drawing:

FIGURE 1 is a top perspective view of a pillow block bearing, with a portion thereof broken away for clarity, having a cap and a base separable along butting surfaces at opposite sides thereof, and wherein means are provided for fastening the cap to the base, with dowel means for facilitating the alignment of the cap relative to the base, with both the slot type and the lug type of separating means of this invention being illustrated.

FIGURE 2 is a top view of the pillow block bearing illustrated in FIGURE 1, wherein the horizontal spacing of the lug type separating means of this invention is best illustrated.

FIGURE 3 is an enlarged fragmentary elevational view of the lug type separating means illustrated at the left side of FIGURE 1, and wherein a separating operation of a bearing cap from a bearing base is illustrated by the use of a prying tool, illustrated in phantom.

FIGURE 4 is an enlarged fragmentary sectional view taken along the line 4—4 of FIGURE 3, and wherein the dowel and slot type separating means of this invention is clearly illustrated.

FIGURE 5 is an enlarged fragmentary bottom view of a bearing cap of this invention, taken along the line 5—5 of FIGURE 3, wherein a dowel, slot type separating means and lug type separating means of this invention are clearly illustrated.

FIGURE 6 is an enlarged fragmentary top view of a bearing base member of this invention, taken along the line 6—6 of FIGURE 3, wherein a dowel, slot type separating means, and lug type separating means of this invention are clearly illustrated.

Referring now the drawings in detail, reference is first made to FIGURE 1, wherein there is illustrated a bearing pillow block 10, comprising a base 11, a cap 12, fastening bolts 13 and 14, and an anti-friction bearing assembly generally designated by the numeral 15, positioned within the base 11 and cap 12.

The base 11 includes feet 16 and 17 for mounting of the bearing block 10 as desired, by means of fasteners (not shown) extending through slotted holes 18 and 20, securing the bearing block 10 to its desired support (not shown). Between the feet 16 and 17 is located a housing portion 21, terminating at its upper end in a butting surface 22 split along a plane generally parallel to the underneath surfaces (unnumbered) of the feet 16 and 17, and passing through the longitudinal central axis of the anti-friction bearing assembly 15. The butting surface 22 is thus divided into opposite radial butting surface portions 23 and 24.

The housing portion 21 of the base 11 is provided with dowel pins 25 and 26, in press-fit relation with the housing portion 21, and protruding upwardly therefrom.

The cap 12 is also provided with butting surface portions 27 and 28, at its lower end thereof, these surfaces also being disposed along a diametrical plane taken through the longitudinal central axis of the anti-friction bearing assembly 15. The cap 12 is disposed with its butting surfaces 27 and 28 in contacting and abutting relation with the surfaces 23 and 24, respectively, of the base 11.

In FIGURE 4, the dowel pin 25 is illustrated in press-fit relation within the bore 30 of the base member 11, and extending across the butting surfaces 23 and 27, into close-fit relation within a bore 31 of the cap 12. The housing 21 of the base 11 and the cap 12 have common front and rear surfaces 32 and 33, respectively, as well as common left and right ends 34 and 35, respectively. A pair of lugs 36 and 37, are carried, respectively by the base 11 and cap 12 on their common surface 32.

With particular reference to FIGURE 3, it is readily seen that the lugs 36 and 37 are spaced vertically, on opposite sides of the mating abutting surfaces 23 and 27, as well as being spaced horizontally, with the lug 36 more closely positioned to the longitudinal central axis of the bearing than is the lug 37. The lugs 36 and 37 are cast or molded integrally with their respective base 11 and cap 12 components of the bearing pillow block 10, and are thus adapted, upon insertion of a prying member therebetween, such as that illustrated in FIGURE 3, and upon clockwise rotation of the prying member, as is illustrated in FIGURE 3, to develop sufficient separating force to overcome the frictional engagement of the dowel pin 25 in the close-fit of the bore 31, to lift the cap 12 from the base 11.

Similarly, spaced lugs 38 and 40 are provided at the right end of the block 10, as viewed in FIGURE 2, for performing an identical function.

A pair of grooves or slot portions 41 and 42 are provided, in the base 11 and cap 12, respectively, cut into their respective butting surfaces 23 and 27. These slot portions 41 and 42 communicate with each other to define a slot 43, at the corner defined by the front surface 32 of the block 10 and the side 34 of the block 10, adapted to receive a screw driver or the like blade type separating means (not shown) from either the front or the sides of the block 10 which, when operated as a lever, will overcome the friction between the dowel pin 25 and the close-fit of the bore 31, thereby separating the cap 12 from the base 11 of the bearing 10.

A similar slot 44 is provided at the right side of the block 10, as viewed in FIGURE 2, opening toward the right side 35 as well as the front face 32 of the block 10. These slots 43 and 44 are also integrally cast in halves, such that, for example the slot halves 41 and 42 are cast integrally with their respective base 11 and cap 12 halves of the block 10.

It is to be noted, that the prying member may take various forms, according to the size of the bearing desired to be separated. For example, in very small bearing pillow blocks the prying member could be a simple screw driver. On the other hand, in bearing pillow blocks of the massive type, the prying member may more properly be a crowbar, or a lever member of like size. Also, while the prying is generally effected to lift upwardly, as is seen in FIGURE 3, and thereby to lift the cap 12 from the base 10, the direction of prying may be reversed, upon a reversal of horizontal positions of the lugs 36 and 37, such that the lug 36 would be spaced radially outwardly a greater distance than the lug 37.

While preferred forms and arrangement of parts have been shown in illustrating the invention, it is to be clearly understood that various changes in details and arrangement of parts may be made without departing from the spirit of the invention.

We claim:

1. A bearing pillow block having an opening extending therethrough, said bearing pillow block comprising a cap and a base each having at least one surface adapted for disposition generally in flush butting relationship to a corresponding surface of the other, said at least one surface defining a plane disposed substantially parallel to the longitudinal axis of said opening, connection means for securing said cap and base together with said butting surfaces in tight engagement, separator means disposed near said butting surfaces for facilitating a prying apart of said cap and base, said separator means comprising at least one pair of slot means disposed in communication with each other in said butting surfaces, and said slot means being provided at corners of a bearing face and side, for insertion of a prying tool therebetween from either front or side direction.

2. The bearing of claim 1 wherein said cap and base are dowelled together for a friction fit.

3. The bearing block of claim 2 wherein two said butting surfaces are provided, spaced on opposite sides of the bearing axis, and dowel means and slot means are provided associated with both of said butting surfaces.

4. A bearing pillow block having an opening extending therethrough, said bearing pillow block comprising a cap and a base each having at least one surface adapted for disposition generally in flush butting relationship to a corresponding surface of the other, said at least one surface defining a plane disposed substantially parallel to the longitudinal axis of said opening, connection means for securing said cap and base together with said butting surfaces in tight engagement, separator means disposed near said butting surfaces for facilitating a prying apart of said cap and base, said separator means comprising at least one pair of separator portions, each portion in a pair being integral with an associated one of said cap and base, each portion in a pair being disposed on an opposite side of said butting surfaces, said separator means comprising at least one pair of separating lugs, each lug in a pair being integral with an associated one of said cap and base, and on opposite sides of said butting surfaces, and the lugs in a given pair being horizontally spaced from each other, 5. The bearing block of claim 4 wherein two pair of lugs are provided each extending longitudinally of the bearing from a bearing face on opposite sides of a bearing axis, with each lug in a pair being horizontally and vertically spaced from the other, for insertion of a prying tool between each lug in a pair.

6. A bearing pillow block comprising a cap and a base, each having at least one surface adapted for disposition generally in flush butting relationship to a corresponding surface of the other, connection means for securing said cap and base together with said butting surfaces in tight engagement, separator means disposed near said butting surfaces for facilitating a prying apart of said cap and base, said separator means comprising at least one pair of separator portions, each portion in a pair being integral with an associated one of said cap and base, each portion in a pair being disposed on an opposite side of said butting surfaces, said separator portions comprising slot means disposed opposite each other and in communication with each other, for receiving a prying tool therebetween, said separator means also comprising at least one pair of separating lugs, each lug in a pair being integral with an associated one of said cap and base, and on opposite sides of said butting surfaces.

References Cited

UNITED STATES PATENTS

| | | | |
|---|---|---|---|
| 2,560,413 | 7/1951 | Carlson | 308—74 |
| 2,652,297 | 9/1953 | Stearns | 308—189 |
| 3,071,419 | 1/1963 | Lower et al. | 308—74 |
| 1,624,343 | 4/1927 | Johnson. | |
| 2,703,263 | 3/1955 | Zernov | 308—74 |

MARION P. SCHWADRON, Primary Examiner

F. SUSKO, Assistant Examiner

U.S. Cl. X.R.

308—207